April 17, 1962 E. OLALAINTY 3,029,526
PSYCHOLOGICAL TESTING APPARATUS
Filed Oct. 19, 1959 8 Sheets-Sheet 1

April 17, 1962 E. OLALAINTY 3,029,526
PSYCHOLOGICAL TESTING APPARATUS
Filed Oct. 19, 1959 8 Sheets-Sheet 3

April 17, 1962  E. OLALAINTY  3,029,526
PSYCHOLOGICAL TESTING APPARATUS
Filed Oct. 19, 1959  8 Sheets-Sheet 6

Fig. 13

United States Patent Office 3,029,526
Patented Apr. 17, 1962

3,029,526
PSYCHOLOGICAL TESTING APPARATUS
Edouard Olalainty, 71 Rue de Fes, Tangier, Morocco
Filed Oct. 19, 1959, Ser. No. 847,387
Claims priority, application France Oct. 21, 1958
18 Claims. (Cl. 35—22)

This invention relates to psychological testing apparatus and more especially to apparatus for deriving what is generally known as the "psychological profile" of an individual. The psychological profile is a set of data which indicate, in terms of certain accepted, standard ratings, the relative dominance of a number of basic psychological tendencies and/or personality traits characteristic of the individual. The derivation of psychological profiles is a standard present-day routine in such organizations as educational and vocational centers, military recruiting centers, psychiatric hospitals, homes for backward children, penal and reformatory establishments, and the like.

Heretofore, psychological profiles have usually been obtained by submitting the test subject to a number of selected tests, such as a concentration test, personality (e.g. Rorschach) test, etc., each such test generally involving some rather lengthy performance on the part of the tested subject and an interpretation and rating by the investigator of such performance in respect to each test. The procedure is slow and time-consuming especially where a large number of subjects are to be tested. Moreover the great degree of personal interpretation involved on the part of the investigator, as regards many of these tests, tends to render the results scientifically untrustworthy.

Objects of this invention are to expedite the establishment of psychological profiles while eliminating completely the investigator's personal or interpretive factor from the results of psychological tests. Further objects are to provide improved apparatus for the more efficient and simplified performance of conventional tests known to psychologists and apparatus for the performance of certain novel tests enabling a scientific and objective investigation of certain psychological or personality traits not heretofore amenable to precise analysis.

It is universally recognized by present-day psychologists that the various traits of character and personality which it is the purpose of psychological profile tests to indicate and measure, find expression in the individual's tactile or motor tendencies, particularly the slight muscular motions and pressures of fingers and wrist in such manual activities as handwriting. It is for this reason that handwriting is a key to character. However, the very large amount of subjectivity and interpretation inherent in any attempt to analyse a person's script has heretofore precluded graphology from unrestricted recognition as an exact science. It is also an object of this invention to provide means for scientifically analyzing and measuring the tactile and/or motor tendencies of an individual as expressed in the latter's handwriting.

In accordance with an important aspect of this invention, there is provided in psychological testing apparatus of the type described, means defining a continuous, sinuous track (e.g. bounded by electrically conductive material), said track comprising a number of consecutive elementary segments of a plurality of types, each type corresponding to a predetermined psychological trait, a stylus (e.g. of electrically conductive material) adapted to be grasped by a test subject for tracing the track, means sensing the making of a contact between the stylus and a boundary of said track within each of said elementary segments, and means for separately counting the number of said contacts occurring in each type of segment, whereby the relative counts will provide a picture of the relative dominance of the corresponding traits in the test subject's psychology, i.e. the subject's psychological profile.

I am well aware that psychological testing apparatus have previously been constructed, including a sinuous track or contour which, during the performance of the test, is traced by a stylus held by the test subject, and counting means for counting the times the stylus has strayed from its prescribed course, as sensed by the contacts of the conductive stylus with a conductive boundary of the track. Such apparatus is conventionally used for rating the power of concentration of a subject in terms of the time required by the subject to trace out a contour of given length and intricacy and the number of errors made in the process. However, all conventional apparatus of this and related types have generally been restricted to rating a single psychological characteristic (concentration), whereas my improved apparatus departs radically therefrom in that, among other features that will appear, it is inherently capable of simultaneously indicating a set of different characteristics of substantially deeper significance in the establishment of a psychological profile than any single trait such as concentration can indicate.

In accordance with the invention, the types of elementary segments of which the track is composed, may include the following basic types: upstrokes; downstrokes; top curves; bottom curves; however additional types of contour segments examples of some of which will be given hereinafter, may and preferably are also included in the contour of the track. The segments are joined sequentially with one another in an appropriate order, and each segment is electrically insulated from the adjacent segments. All the segments pertaining to a common type are connected in common to an individual counter, so that on completion of a test the array of counters will yield separate totalized indications of the number of times the test subject has allowed the stylus in his hand to stray out of control and strike a boundary of the track for each type of segment. The relative counts thus registered at the end of a test will yield a set of relative numerical data susceptible of immediate and objective interpretation in accordance with standard psychological knowledge.

In accordance with another feature of the invention, means are provided for measuring and indicating the finger pressure exerted by the subject on the stylus and also the pressure with which the subject is applying the stylus on the track. Each of these indications as determined for each type of segment will yield additional valuable data for the establishment of the subject's psychological profile as will readily be understood by those familiar with psychology.

In a preferred embodiment of the invention to be presently described in detail, the boundary of each contour segment of the track constitutes one terminal of an electrical circuit the opposite terminal of which is provided by the tip of the stylus. All of the track segment terminals relating to track segments of a given shape or type are connected in common to a related counter of any suitable character. Further, the track is secured to an electrically conductive plate mounted with a certain degree of resiliency relative to the frame of the apparatus, and constituting one armature of a capacity having another armature secured fixedly in the base of the frame in capacitive relation with said first armature. The capacity is connected in the tuned circuit of an amplifier to vary the output thereof in response to the variations in the capacity, thereby to indicate on a suitable indicating and/or recording instrument the degree of pressure exerted at any time by the stylus on the track. According to yet a further feature the stylus itself is constructed as a capacitive pressure pick-off of generally similar character to that just described in order to yield further indication and/or record of the finger pressure exerted on the stylus at any time. The indications provided by the variations of each of the pressures as just mentioned are preferably registered or recorded in such a manner as to permit of their being correlated with each type of segment of the track. This may be achieved by recording respective graphs upon a common tape.

In a modified form of the invention, the pressure indicating means may comprise the combination of a sliding brush contact secured on a movable element adapted to assume a variable displacement in response to the pressure to be indicated, and a set of contacts arranged in the path of movement of the brush contact and each connected in series with a resistor, all the resistors being connected in circuit with a galvanometer instrument having a recording stylus mounted on the movable indicator thereof, so that any pressure developed by the tested subject will correspondingly displace the sliding contact over a corresponding number of the fixed contacts and thereby will insert a corresponding number of resistor elements into the galvanometer circuit and cause a commensurate deflection of the indicator and stylus with respect to a suitable record medium. This arrangement makes it possible to use rugged galvanometer instruments for indicating the comparatively low variations in pressure involved.

The mechanical means for transmitting the muscular pressure variations of the test subject may desirably, in this embodiment of the invention, assume the following forms:

For transmission of the pressure of application of the stylus upon the track, the track is mounted at one end of a balance beam the opposite end of which carries the corresponding sliding brush contact. For transmission of the finger pressure around the stylus, the stylus is provided with a set of longitudinally spaced depressible keys and an axially displaceable taper member is axially displaceable in the stylus in response to depression of said keys, and carries the corresponding sliding contact.

In another modification of the invention, the elementary portions of the track are carried on a plate mounted at one end of a balance beam which carries at its other end a set of contacts that are progressively inclined at larger and larger angles with respect to the horizontal so as to cause the progressive closure of a corresponding set of electric circuits adapted to actuate appropriate control, signalling and/or recording means.

In a somewhat more elaborate form of the invention, the complete testing apparatus may advantageously include additional devices for testing (and re-educating) the abductor, extensor and flexor muscles of the subject's hands. Yet other means may be included for testing the degree of inclination or slant imparted by the subject to the stylus during the preceding tests, which slant, as is well-known to psychologists, provides a further important trait in the psychological profile of a subject.

The combined data provided simultaneously by the apparatus (including especially the number of times the stylus has strayed from the track for each type of segment, the stylus pressure on the track for each type of segment, and the finger pressure on the stylus for each type of segment, and/or any of the additional test results mentioned above), will yield a very complete and reliable picture of the subject's tactile motor tendencies establishing the individual's psychological profile and enabling, if required, any defective tendencies to be corrected by re-education.

Exemplary embodiments of the invention will now be described by way of illustration but not of limitation with reference to the accompanying drawings, wherein.

Referring to the drawings in detail and first to FIG. 1, it will be seen that an apparatus embodying this invention may include casing 1 which is formed with a forwardly jutting base panel 2 preferably sloping downwards at a slight angle and supporting a test track 3 of a type to be described in detail hereinafter. A stylus 4, also to be described in greater detail, is connected with the internal circuitry contained in casing 1 by way of a flexible cable 5 so as to be conveniently guided by a test subject's hand along the track 3.

The rear wall (FIG. 2) of casing 1 which normally would be directed, in use, towards a psychologist or other test operator seated opposite to the tested subject, provides a vertical panel formed with a number of viewing windows through which the indications of as many separate counters and dial instruments may be conveniently observed. The counters are eight in number in the example shown and are respectively designated P, M, PSS, CI, CS, DD, DM and PSP, the significance of which designations will be given at a later point. Adjacent to each of the last six above-designated counter windows there is a signal lamp L which is adapted to light up every time a unit is registered by the related counter. Near the base of the panel a pair of milliammeter dials 25 and 29 are mounted so as to be viewable through the windows designated PP and PS respectively. An additional signal lamp C is arranged to be illuminated when the circuits of the apparatus are placed under power. The dial instrument shown at S is a suitable timekeeper or stop-watch. Press-button switch 7 (FIG. 1) designates a signal bell control.

Figure 3:
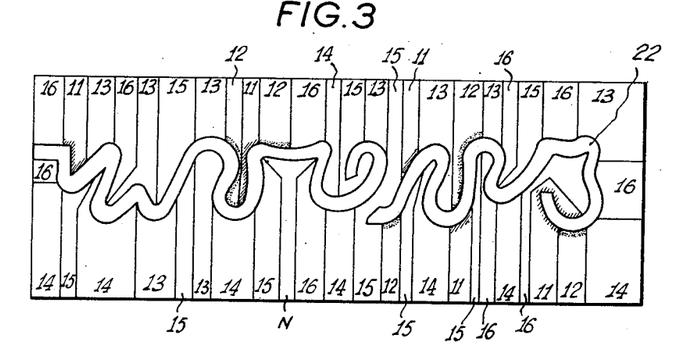
FIG. 3 shows one example of a suitable testing track usable in accordance with the invention, on a larger scale than above.
Figure 3A:
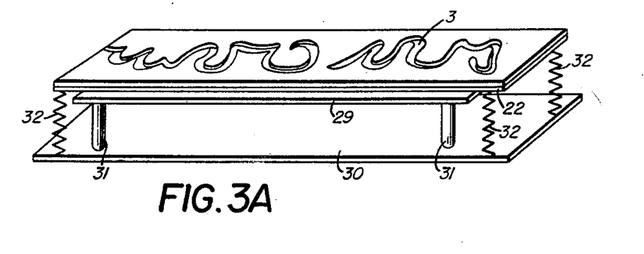
FIG. 3A is a perspective view showing a condenser arrangement by which the stylus pressure on the track can be detected.

Referring to FIG. 3, the test track there shown is seen to comprise a series of interconnected segments broadly similar to the elementary components of handwritten script having basic psychological significance, and linked with one another in accordance with the principal dynamical combinations found in handwriting. As shown, the plurality of segments of the track may be broken down into the following four principal types: "Bottom curves", "Top curves", "Downstrokes" and "Upstrokes". Moreover, certain areas of the track are of a character that is associated by psychologists with the tendency to "Impulsion", and other areas are of a character associated with the psychological trait of "Restriction".

Thus there are six types in all provided in the exemplary embodiment of the apparatus, and these six types are herein designated for convenience in further reference thereto by the following symbols:

Downstroke segments ____________________________ DD
Upstroke segments ______________________________ DM
Bottom curve segments __________________________ CI
Top curve segments _____________________________ CS
"Impulsional" segments _________________________ P
"Restrictional" segments _______________________ M The track thus provided is in the form of a circuitous strip of insulating material of appropriate width and is bounded along both of its opposite sides by separate conductive strips with adjacent strips electrically insulated from each other. All the strips bounding P-type segments as defined above are designated by the common reference numeral 11, all strips bounding M-type segments by numeral 12, and all strips boundings CS-, CI-, DM- and DD-type segments, by the respective reference numerals 13, 14, 15 and 16.

Figure 2:
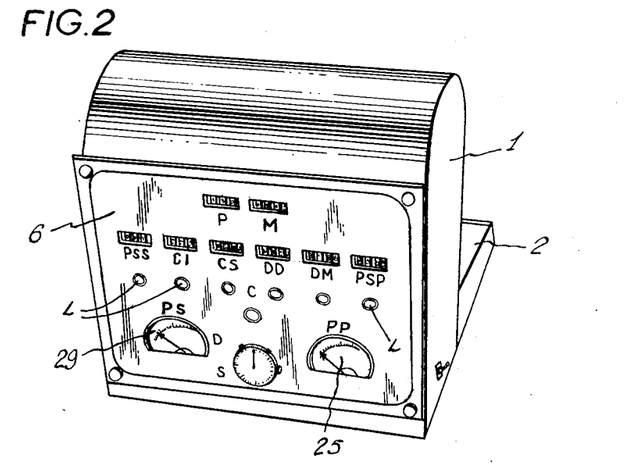
FIG. 2 is a rear perspective view thereof.
Figure 4:
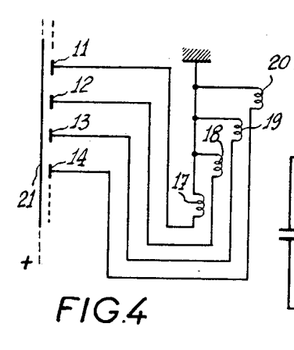
FIG. 4 is a partial and simplified circuit diagram illustrating the counting means used.
Figure 6:
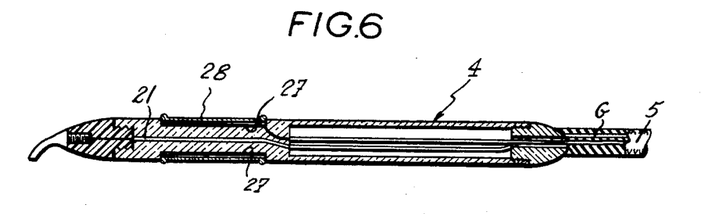
FIG. 6 is an axial sectional view of a stylus.

Referring now to FIG. 4, all the strips 11 corresponding to P-type segments are connected in common to one terminal of a suitable counter circuit, herein schematically represented by an inductance 17; similarly all the strips 12, 13, 14, 15 and 16 are respectively connected in common to a corresponding one of a set of counters. In FIG. 4 only the four counters 17, 18, 19 and 20 corresponding to segments 11, 12, 13 and 14 are shown. The opposite end of each counter circuit is connected to the common mass of the apparatus, or negative terminal of the current source, while the positive terminal of the source, indicated as conductor 21, is connected to the tip of the stylus, as shown in FIG. 6. Thus every time the stylus tip contacts any segment the particular counter circuit with which all segments of the same type as the contacted segment are connected, is energized so as to increase by one unit the number indicated by the particular counter. Since the counters may be quite conventional, e.g. drum-type counters, their construction has not been illustrated. In FIG. 2, the six windows through which the respective counters are viewed are designated by the same letter symbols as the six types of segments to which the counters correspond.

Figure 5:
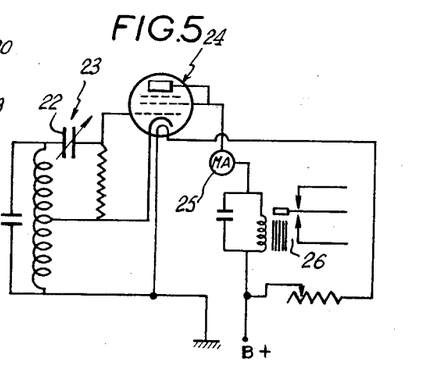
FIG. 5 is a partial circuit diagram relating to a pressure-indicating means.

Means will now be described for measuring the pressure of the subject's grip on the stylus and the pressure with which the stylus is applied by him against the track. Both pressure measurements may be performed by capacitive circuits of a similar type, one example of which is shown in FIG. 5. In this figure the condenser 23 is the measuring condenser. In the case of the measurement of the stylus pressure on the track, condenser 23 has a movable armature 22 constituted by a conductive plate on which the track 3 is secured, which plate is yieldably mounted through springs 32 on a base or frame 30 for slight movement toward and away from a fixed plate 29 forming the opposite armature of the measuring condenser and being mounted by insulating posts 31 on the base 30. In connection with the measurement of stylus gripping pressure, condenser 23 would be embodied in the stylus itself as presently described with reference to FIG. 6.

In either case the measuring condenser 23 may be connected in the control grid circuit of a pentode amplifier tube in the manner shown in FIG. 5. As shown, the control grid circuit includes a tuned circuit comprising an inductance and capacity in parallel connected between the control grid and ground. The inductance has a midtap connected to the cathode of the tube and further connected to the control grid through a grid bias resistor. The measuring condenser 23 is inserted in series between the control grid and the inductance-capacitance circuit. The anode of the tube is connected to positive battery by way of a milliammeter-type indicating instrument 25 and the winding of a differential relay 26 the function of which will be explained later. It will be understood that any variation in the capacitance of condenser 23, as resulting from varying pressure of the test subject's grip on the stylus or application of the stylus on the track, as the case may be, will cause a corresponding variation in the anode current of the pentode and in the indication given by meter 25. In FIG. 2, the dial of meter 25 is shown as viewable through the rear panel of the apparatus for indicating say the gripping pressure on the stylus, while a similar ammeter dial is shown at 29 for indicating the application pressure of the stylus on the track. The indicating instruments such as 25 and 29 may of course be replaced or complemented with suitable recording devices, examples of which will be described later. Furthermore, the relay winding 26 is so predetermined that when the anode current in the pentode exceeds a predetermined value, corresponding to a predetermined high degree of muscular pressure exerted by the test subject, say 150 grams per square centimeter, the relay is operated to actuate a counter device (not shown) which may be similar to the counter devices previously mentioned in connection with the track segments. The counter is actuated to add one unit to the count indicated by it, as appearing through a window formed in the rear panel of the apparatus similar to the counter windows relating to the track segments. In FIG. 2 the counter window showing the number of times the test subject's finger grip on the stylus has exceeded the predetermined level is shown at PSP, while the counter window indicating the number of times the subject's pressure on the track has exceeded a predetermined level is shown at PSS; respective signal lamps are shown associated with both counter windows.

Referring to FIG. 6, the stylus 4 is shown as comprising a generally tubular body of conductive material which may be connected to the common ground of the apparatus, as through a conductor G extending through cable 5. A metallic bushing 27 is mounted around a reduced-diameter, solid, portion of the body in insulated relationship therewith, to provide an inner armature for the measuring condenser 23. Surrounding bushing 27 and insulated therefrom while being electrically connected with the body of the stylus is an outer bushing 28 made with substantial resiliency or flexibility so as to yield under finger pressure and modify the capacitance of the condenser constituted by bushings 27 and 28. The inner bushing 27 has a conductor soldered to it and the conductor is suitably insulated and led out of the body of the stylus for connection to the circuitry of the apparatus in the general manner explained above with reference to FIG. 5. It will be understood that the condenser assembly 27—28 is arranged in such a longitudinal position on the body of the stylus as to correspond to the area that is normally gripped between the thumb and fingers when the stylus is gripped in a convenient manner similar to any writing instrument.

Figure 1:
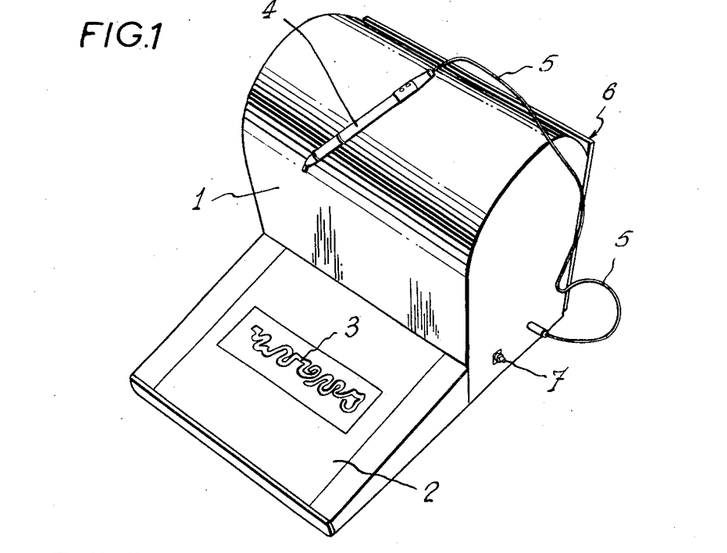
FIG. 1 is a front perspective view of one form of apparatus according to the invention.

The push-button 7 shown in FIG. 1 may as already indicated serve to actuate a bell or similar alarm within the apparatus and may be used in studying the subject's reactions to such an unexpected event as the ringing of the alarm. Chronometer S may be used to study the subject's reaction time as well as the total time taken to complete a test.

Means will now be described with reference to FIGS. 7 to 12, for providing a tape record of the test results obtained by means of equipment generally similar to that described above in connection with FIGS. 1–6. The tape 100 is reeled off a roll 101 at uniform speed and passed around a set of guide pulleys as shown and thence led off at 102 to a conventional reeling mechanism (not shown).

Figure 7:
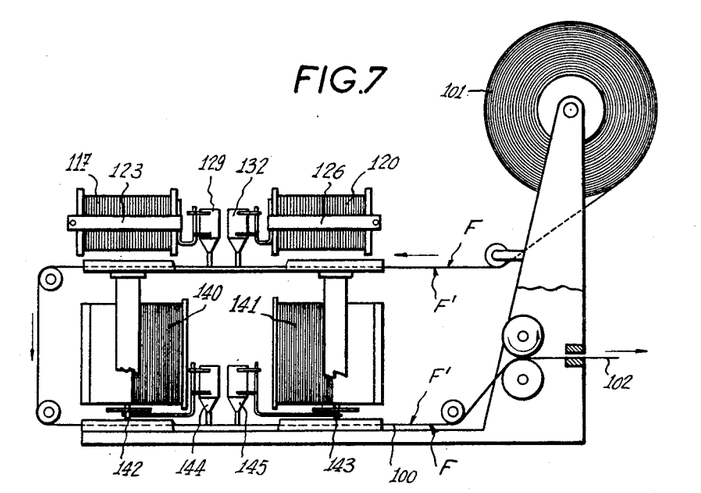
FIG. 7 is a side elevation, partly in section, of recording means for the recording of test data obtained by the apparatus of the preceding figures on a tape.
Figure 8:
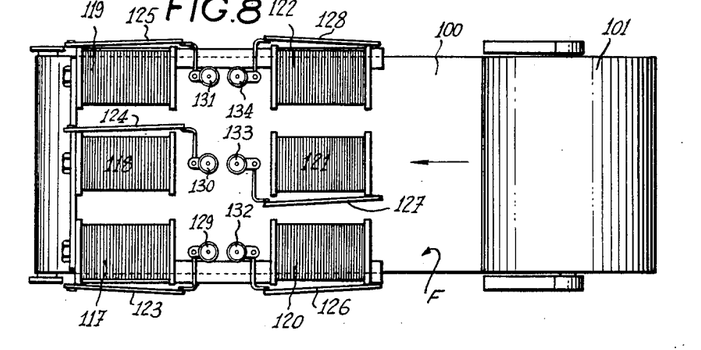
FIG. 8 is an overhead view of FIG. 7.
Figure 9:
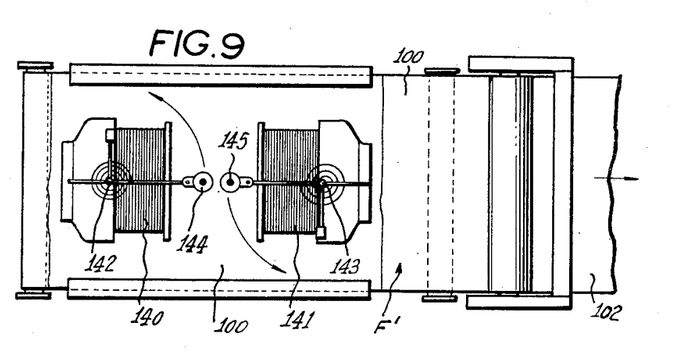
FIG. 9 is an underneath view of FIG. 7.

The device comprises a number of electromagnetic relays 117, 118, 119, 120, 121 and 122 the windings of which may be connected in a circuit similar to that shown in FIG. 4 for the counter windings 17, 18, 19, 20. With each relay is associated a vane armature respectively 123 through 128 which is attracted, on energization of the relay, in opposition to a spring (not shown). Attached to a side of each armature is a writing element or pen, 129 through 134, the extremity of which engages a face of the tape. In operation, as the tape is fed at constant velocity in the direction indicated by the arrows, the respective writing elements each record thereon a continuous straight line since the relays are normally deenergized. On energization of a relay, the corresponding writing element is momentarily deflected and records a peak on the corresponding graph. It will be understood that each relay solenoid is arranged to be energized on establishment of a contact between the stylus and the track boundary of a corresponding type of track segment to which type the relay is assigned. Thus the resulting record enables the count of such contacts for each type of segment to be readily effected and, moreover, provides further information as to the location of each contact along the track and the time, during the test period, at which it was made.

Two galvanometers 140 and 141 have their windings connected for excitation by the current flowing in a pair of related circuits in response to the pressure exerted by the stylus on the track, and the pressure exerted by the subject's fingers on the stylus, respectively. The circuits will be described in detail hereinafter. The moving elements 142, 143 of the galvanometers carry writing instruments 144, 145, arranged to engage the tape 100 on the face F' thereof, opposite from the face F engaged by the writing instruments controlled by the solenoids described above. It will be noted that there exists a constant, predetermined, longitudinal displacement along the length of the tape between the records of the styli 129–134 on the one hand and the styli 144, 145 on the other.

Figure 10:
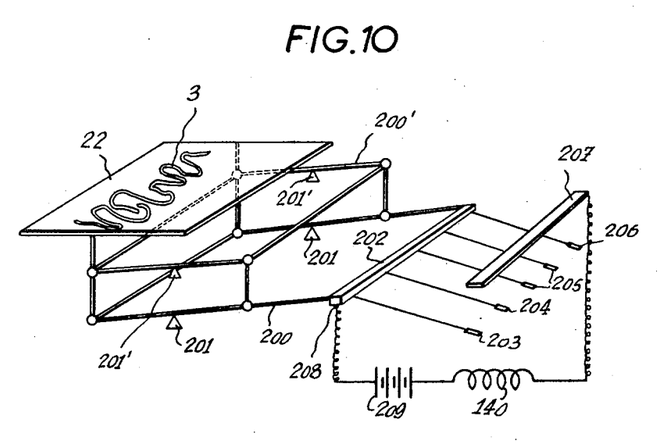
FIG. 10 is a diagrammatic perspective view illustrating means for indicating the pressure of application of the stylus against the track carrying plate.
Figure 11:
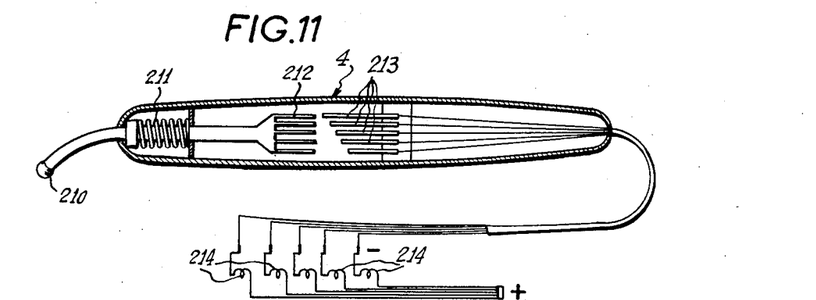
FIG. 11 is an axial sectional view of a modified stylus.
Figure 12:
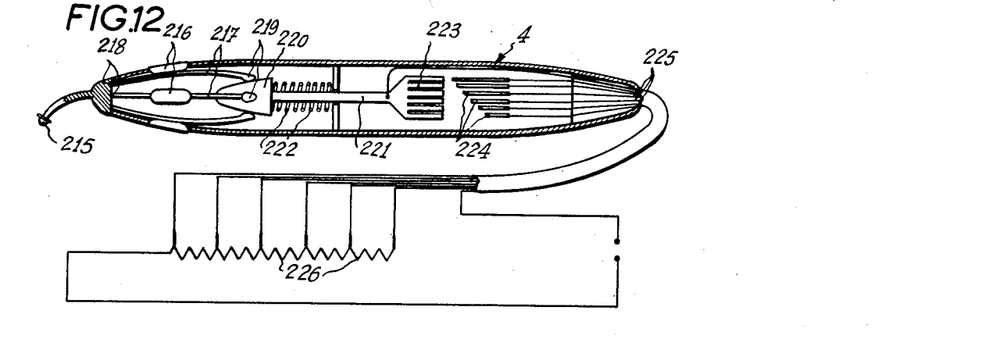
FIG. 12 shows a further modification of the stylus.

The electric circuits for energizing the galvanometers 140 and 141 are schematically shown in FIGS. 10 and 11 and in FIG. 12, respectively. As shown in FIG. 10, the test track 3 is supported on a plate 22 which is supported at the one end of a balance beam 200 which herein is shown as comprising a parallelepipedic structure in association with an upper, parallel, balance beam 200', and as pivoted therewith upon the two pairs of knife-edge pivots 201 and 201'. The opposite end of this composite balance-beam structure carries a bar 202 on which are mounted a set of spaced strips or vanes 203 through 206, supported at incrementally increasing inclinations along the bar so that, on deflection of the balance beam, said strips will successively contact a stationary bar 207 upon which an electric resistance wire is wound. One end of this resistance provides one terminal of the energizing circuit for galvanometer 140, while the other terminal 208 of that circuit is provided by the bar 202. The circuit includes the D.-C. source 209. It will be understood that in response to the variations in pressure exerted on the plate 22, a smaller or a greater number of the vanes 203–206 will contact the bar 207, thus inserting into the galvanometer circuit a smaller or larger amount of resistance. The deflection of the galvanometer pointer will vary accordingly, and the pen 144 will record corresponding variations in the graph. In practice the variations will be incremental and the graph would show a series of successive flat areas of varying level since the variations in resistance 207 as introduced by the vanes are finite rather than continuous. The accuracy thus achievable is amply sufficient for the purposes of the test.

In FIG. 11 is illustrated a modification whereby similar results may be accomplished with a track carrying plate 22 which is stationary rather than movably mounted as in FIG. 10. Instead, it is the tip 210 of the stylus which in this form of the invention is resiliently mounted. The tip 210 is slidably mounted in opposition to a spring 211. At the rear, inner, end of the tip member is secured to a multi-pronged sliding contact member 212 which cooperates with a set of stationary contacts 213 mounted in stepped or staggered relationship in the stylus and connected with resistances 214 inserted as before in the circuit of galvanometer 240. Depending on the mount the tip 210 is depressed by muscular pressure against the track, the prongs of the movable contact member 212 will make contact with a varying number of the stepped fixed contacts thus again varying the total resistance inserted in the galvanometer circuit.

It should be noted however that this modified construction of the stylus for sensing the pressure on the track may be at a disadvantage in the (preferred) embodiment of the invention where it is simultaneously desired to indicate the variations in finger pressure upon the stylus. In this case the stylus would desirably be constructed as shown in FIG. 12 now to be described. In this construction, the stylus 4 is provided with a fixed protruding tip 215 secured to a tapered end member 218 of the stylus. A plurality of resilient strips 217 have their front ends secured to the end member 218 in angularly spaced relation around the stylus periphery and carry finger keys 216 intermediate their ends which protrude slightly above the peripheral surface of the stylus casing through suitable apertures in said casing so as to be depressible by the test subject's finger pressure in the normal use of the stylus. The free rear ends 219 of the resilient strips 217 are in free sliding engagement with the tapered surface of a member 220 secured at one end of an axial rod 221 mounted for axial reciprocation in the stylus body in opposition to a coil spring 222 which urges the rod 221 with member 220 to a forward position. The rear end of rod 221 carries a multi-pronged contact 223 cooperating with a set of staggered contacts 224 similar to the arrangement shown in FIG. 11. The contact members 224 are connected, by way of a flexible cable led out at 225, with taps on a resistance 226 connected in the circuit of galvanometer 141. In use, the test subject grips the stylus near its forward end and in so doing depresses the keys 216 a variable degree, thus causing the camming action of the rear ends 219 of spring strips 217 against taper member 220 to push the rod 221 axially rearward a corresponding variable amount. The cooperation of the movable contact member 223 with the fixed contacts 224 thus varies the amount of resistance interposed in the galvanometer circuit, so that the related pen records the finger pressure variations on the related graph.

It will be understood from the foregoing that the deflections of the respective galvanometers 140 and 141 as resulting from pressure variations against track plate 22 and around stylus 4 respectively, as well as the energizing pulses applied to the relay solenoids 117, 118, 119, 120 and 121, as resulting from the inadvertent contacts of the stylus with the track boundaries in different areas of the track, are simultaneously recorded on respective graphs of tape 100 so as to provide complete information as to the subject's reactions at every point of the track. Since moreover the tape is fed at a constant predetermined velocity, the length of the record will additionally indicate the time required by the subject to complete the test.

Figure 13:
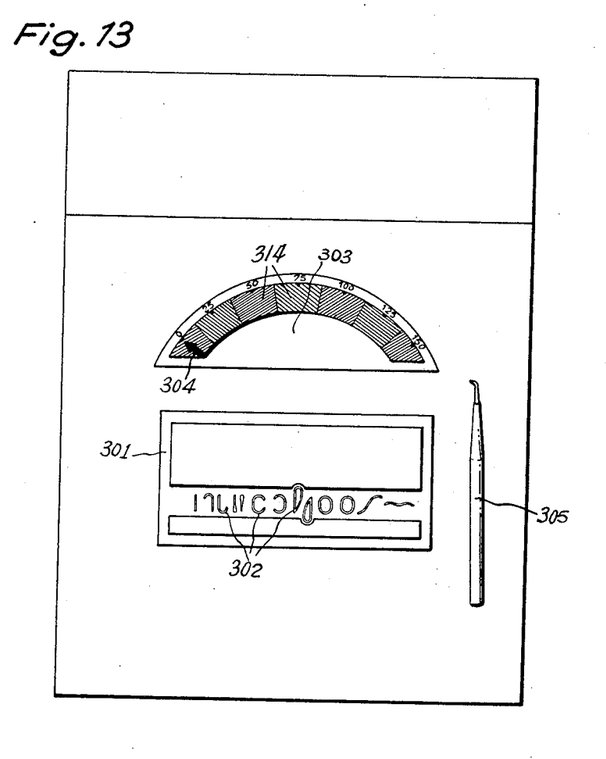
FIG. 13 is a front view illustrating a modified device for indicating application pressure of stylus against track.
Figure 14:
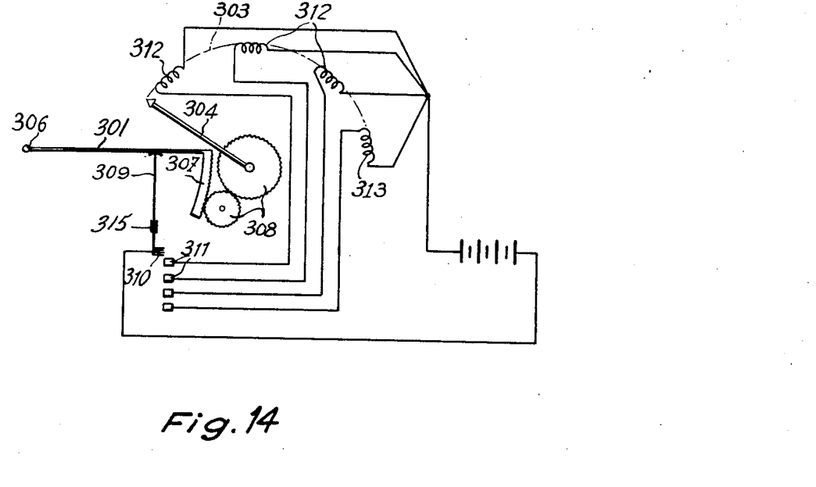
FIG. 14 is a circuit diagram of the device of FIG. 13.

FIGS. 13 and 14 illustrate further modified means for indicating the variations in contact pressure of the stylus against the track. In this construction, there is provided a plate 301 carrying a test track 302 thereon. Also provided in the apparatus is an arcuate dial 303 with the calibrations of which a rotatable pointer 304 cooperates.

The stylus is shown at 305. In this modification, the arrangement, presently described, is such that the variations in contact pressure of stylus 305 against the plate 301 cause corresponding displacements of pointer 304 along the dial calibrations. Advantageously, the dial may be subdivided, as shown, into a sequence of areas 314 with each of which a signal lamp is associated, these lamps being arranged to be illuminated one by one, as the pointer 304 enters the corresponding dial segment. The lamps may be of different color. Further an audible alarm may be sounded as the pointer enters an ultimate one of the segments indicating excessive pressure. FIG. 14 shows one form of means whereby this type of operation may be achieved.

As shown, the plate 301 is mounted for limited pivotal movement about a pivot 306 and has attached to its forward end a gear sector 307 concentric with the pivot and meshing with a gear of a gear train 308 which rotates the pointer 304. Moreover, the plate 301 at an intermediate point of it engages the top of a vertically depressible rod 309 which is slidable in a guide 315 and at its lower end carries a brush 310 cooperating with stationary contact segments 311 connected in a suitable circuit with the respective signal lamps 312 and alarm bell 313 of dial 303 to energize said lamps and bell in the manner described above.

Referring to FIGS. 15 to 18, it will be noted that these views illustrate apparatus, according to an aspect of the invention, for testing an individual's motor tendencies by means differing somewhat from those heretofore described, and usable in addition to or instead of these latter, or in various combinations therewith.

Figure 15:
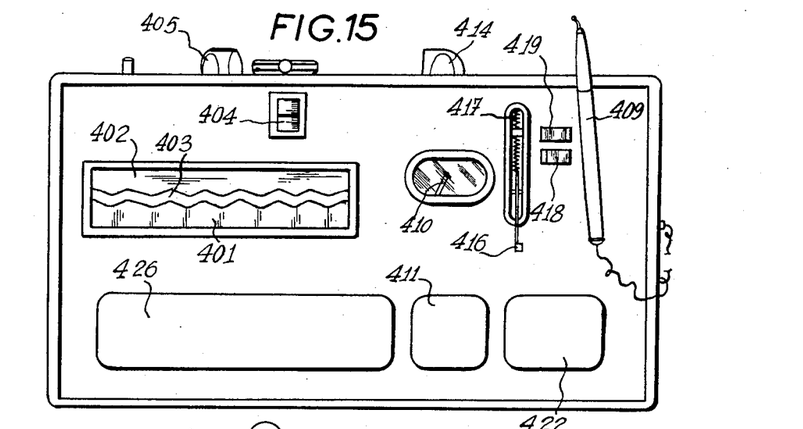
FIG. 15 is a front view of apparatus according to the invention for testing (and reeducating) a subject's motor activity.
Figures 16, 17, 21:
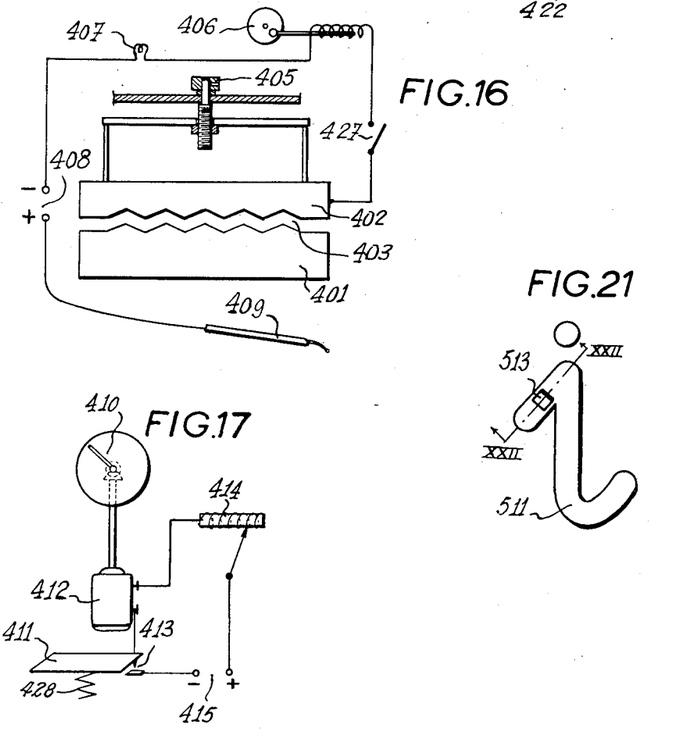
FIG. 16 is a partial schematic view relating to that section of the apparatus of FIG. 15 concerned with motor precision.
FIG. 17 is a partial schematic view showing that section of the apparatus concerned with the abductor muscles.
FIG. 21 is an enlarged showing of a part of FIG. 19 for explanatory purposes.
Figure 18:
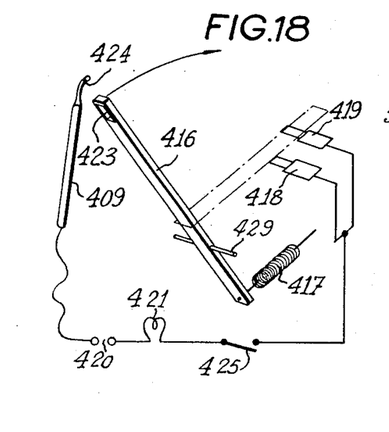
FIG. 18 is a partial schematic view showing that section concerned with the extensor and flexor muscles.

The apparatus shown generally in front view in FIG. 15 actually includes three different devices, which are shown individually in schematic detail in each of FIGS. 16, 17 and 18.

A first of these devices (see FIGS. 15 and 16) comprises a pair of metallic plates or jaws 401, 402 having adjacent spaced edges so shaped as to define an irregular or jagged zigzag track 403 between them. The width of this track is adjustable by action on a screw 405 and with reference to a calibrated scale 404. For this purpose plate 401 is fixedly mounted while plate 403 is mounted for parallel displacement towards and away from plate 401 by action on screw 405, as will clearly appear from the simplified showing of FIG. 16. The plates 401 and 402 on the one side, and a stylus 409 on the other, are connected in an electric circuit which includes a power source 408, a signal lamp 407, and the relay winding of a totalizing counter 406 as well as a power switch 427. The test involves passing the tip of the stylus 409 through the zigzag track 403 as quickly as possible without touching either track boundary defined by plates 401, 402. Each such contact causes the lamp 407 to light up and is simultaneously registered in counter 406. The test may be repeated with progressively narrower and narrower adjustments of the track 403 to determine the subject's skill or precision. In performing this test, the subject is told to rest his wrist upon a rest-plate 426 which is preferably arranged to operate switch 427 in case of excessive wrist pressure.

A further device included in the apparatus of FIG. 15, and which is separately illustrated in FIG. 17, comprises a pointer 410 arranged for rotation by means of an electric motor 412 in the apparatus. A wrist-rest plate 411 is mounted on a spring 428 for limited resilient movement under pressure of the subject's wrist and, when depressed a predetermined amount, closes a switch 413 inserted in the energizing circuit connecting motor 412 with power source 415. Also connected in this circuit is a potentiometer device 414 for adjusting the speed of motor rotation. The test here lies in gripping the stylus 409 and following the revolving pointer 410 with the tip of the stylus while holding the wrist firmly pressed against the rest-plate 411. Should the wrist pressure against this place relax, switch 413 is opened, motor 412 is deenergized and the pointer rotation stops. The test may be repeated at gradually increasing speeds of pointer rotation as adjusted through potentiometer 414. This test involves the abductor muscles and can serve to correct the action of these muscles in both hands.

A third device included in the apparatus of FIG. 15 is separately shown in FIG. 18. This comprises a metallic lever 416 rockable on a pivot 429 and normally urged to a position in which it is rocked forwardly, i.e. towards the individual being tested, by the action of a spring 417. The rearward displacement of the lever is limited by either of two stops 418 and 419, one or the other of which can be inserted into active position in the path of movement of the lever by action on a related slider or key. Depending on which of the two stops is in action the rearward lever displacement is adjusted to a relatively short or a relatively long amount. The test here is to insert the tip 424 of stylus 429 into a recess 423 provided near the end of a rocker lever 416, and then to actuate the lever back and forth exclusively by finger action while keeping the wrist steadily pressed against the rest plate 422 which is resiliently mounted as in the case of the plate 411. As shown in FIG. 18, an electric circuit is provided whereby a signal lamp 421 will be energized from a source 420 and light up whenever the lever 416 contacts the particular one of stops 418 or 419 which is set to active position, provided the tip 424 of the stylus is at such time engaged in the recess 423 of lever 416. The energizing circuit further preferably includes a switch 425 operated by the pressure of the subject's wrist upon the rest plate 422 in a manner similar to what was described in connection with rest plate 411 and switch 413. The purpose of this device is to test the shorter and longer extensor and flexor muscles, and to provide correcting exercise therefor.

FIGS. 19 to 22 illustrate further devices according to the invention for testing additional personality traits, specifically what are sometimes known as tendencies to slant reversal. The apparatus shown in front view in FIG. 19 comprises a first device 501 including a slotted tubular member 502 mounted for adjustable rotation about its axis by means of a button 503 so as to present its longitudinal slot 504 at a convenient orientation towards the subject. The tubular member is made of insulated material but has contact strips 505, 506 (FIG. 20) attached to it along the spaced parallel sides of slot 504, and these contacts are connected in common and to the circuit shown in FIG. 20 as including the stylus 510, a source 508, and a signal device 509 (a lamp or a bell). In use, the tubular channel member 502 is turned so that the slot 504 is oriented at such an angle to the subject that he can insert the conductive tip 510 of the stylus into it when holding the stylus at a certain predetermined inclination, e.g. horizontal, and he is asked to lead the stylus through the slot without altering this inclination. Should he involuntarily do so, the conductive tip 510 will engage either one of the side contacts 505, 506 thereby completing a circuit for energizing the signal 509.

In a modified form of this device, the tubular member 502 may be made of two longitudinal parts adjustably rotatable with respect to each other so as to permit of varying the width of the intervening slot 504, thereby to adjust the difficulty of the test, somewhat similarly to what was described in connection with the zigzag track 403 of FIGS. 15 and 16.

Figure 19:
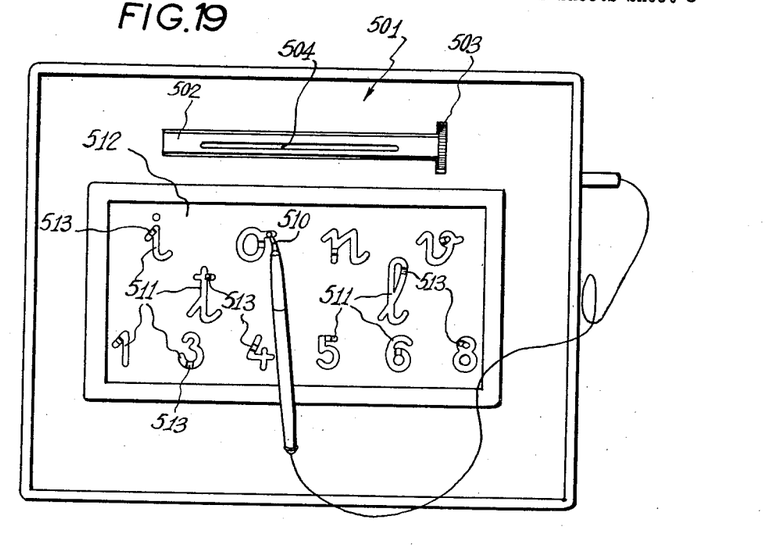
FIG. 19 is a general view of a device according to the invention for testing "slant reversal" tendencies.
Figure 20:
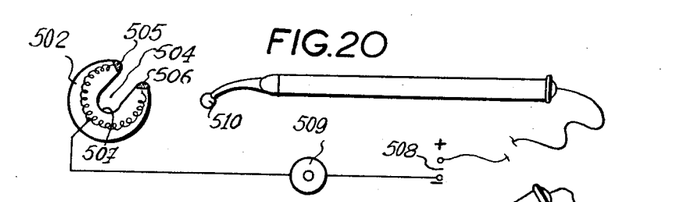
FIG. 20 is a partial schematic view of the device of FIG. 19.
Figure 22:
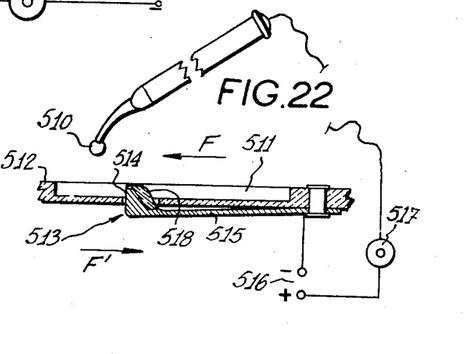
FIG. 22 is a partial schematic and sectional view on the line XXII—XXII of FIG. 21, still further enlarged.

The apparatus of FIG. 19 further includes another device for testing the so-called "reverse" motor tendencies of the subject. This device comprises a panel 512 of insulating material in which a number of selected graphic signs, i.e. letters and/or numerals of large size are formed as grooves recessed in the panel. In each of these graphic signs is interposed a switch contact 513 which is constructed in a manner that will be apparent from FIGS. 21 and 22. That is, each of the contacts comprises a spring strip 515 fixed at one end to the panel 512 and extending along the rear surface of the latter. The strip has a head portion 514 protruding through an aperture in the panel, and this head portion is coated on one side with an insulating coating 518. The spring contact member 515 is connected in circuit with a D.-C. source 516, a signal lamp or bell 517, and the stylus 519. The arrangement is such that when the subject, who is instructed by the psychologist to trace each graphic symbol on the panel with the tip of the stylus, traces the symbol in a correct or normal sense, as represented by the arrow F in FIG. 22, the stylus tip 519 passes over the insulated side of the protruding spring strip portion 514, so that the signal circuit is not established, and at the same time the spring strip yields and allows the stylus to complete the tracing of the letter or numeral. However, should the subject, as a result of a strong abnormal "reversing" motor tendency attempt to lead the stylus along the symbol in a reverse direction (arrow F'), then the conductive tip 510 of the symbol will strike the uncoated side of the head 514 thereby completing the signal circuit; at the same time the subject will be prevented from completing the tracing of the symbol owing to abutment of the head 514 against the stylus.

What I claim is:

1. In psychological testing apparatus, means defining a sinuous track comprising a number of elementary segments of a plurality of types each type corresponding to a particular psychological tendency, a stylus adapted to be gripped by a test subject for tracing said track, electric means sensing a contact of the stylus with a boundary of the track, a record tape and means for feeding the tape, a plurality of recording elements respectively corresponding to said types of segments and cooperating with said tape to record respective graphs thereon, and a plurality of electromagnetic means electrically connected with said sensing means and each mechanically connected with a respective one of said recording elements for actuating said element and thereby recording a deflection on the related graph on said sensing means sensing a contact in a track segment of the related type.

2. In psychological testing apparatus, means defining a sinuous track comprising a number of segments of a plurality of types each type having a predetermined psychologic significance, a stylus adapted to be grasped by a test subject for tracing the track, first pressure sensing means associated with the track for sensing the pressure exerted thereon by the stylus, second pressure sensing means associated with the stylus for sensing pressure exerted thereon by the subject, a record tape and means for feeding the tape, a pair of writing elements cooperating with the tape to record respective graphs thereon, a pair of electric circuits operatively connected with the respective pressure sensing means to deliver a variable electric output in response to the pressure sensed by said sensing means, and a pair of variably deflectable electromagnetic means electrically connected with said circuits and mechanically connected with said writing elements to deflect the latter in proportion to the outputs of said circuits, whereby said graphs will respectively represent the variations in the pressure sensed by said first and second pressure sensing means.

3. In psychological test apparatus, a device for testing a subject's motor accuracy comprising a pair of relatively movable coplanar plates defining a zigzag groove therebetween, a stylus having a tip insertable into said groove, electrical means sensing contact between said stylus tip and a side boundary of said groove as the stylus is drawn through the zigzag groove by a test subject, means for counting said contacts during a test, and means for relatively moving said plates toward and away from each other to adjust the width of the groove and hence adjust the difficulty of the test.

4. In psychological test apparatus, a device for testing and exercising a subject's manual abductor muscles, comprising a rotatably mounted pointer, an electric motor energizable to rotate said pointer, means for adjusting the speed of pointer rotation, a resiliently mounted wrist-rest plate positioned to permit a test subject to follow the rotation of said pointer with a stylus held in his hand while resting the wrist of that hand on the plate, and a switch operated by resilient movement of said plate under wrist pressure to energize said motor and rotate said pointer.

5. In psychological test apparatus, a device for testing and exercising the manual extensor and flexor muscles of a subject, comprising a lever mounted for rocking movement, variably settable abutment means for limiting the rocking movement of said lever, a wrist rest plate positioned to permit a subject to rock the lever by means of a stylus held in engagement therewith while resting the subject's wrist on said plate, and electrical means energized by engagement of said lever with said abutment means for operating an indicator.

6. In psychological test apparatus, a device for testing a subject's manual orientation tendencies comprising means defining a rectilinear, generally horizontal slot, said means rotatable about an axis parallel to the slot for adjusting the orientation of said slot, a stylus having a tip insertable into said slot and electrical means sensing and indicating a contact of said stylus tip with a side of said slot as the stylus tip is drawn through the slot by the subject.

7. In psychological test apparatus, a device for testing a subject's reverse graphic tendencies comprising a panel, recesses in said panel defining a set of graphic symbols which are traceable with the tip of a stylus inserted thereinto by a test subject, means projecting into the recess defining each symbol for arresting the motion of said stylus tip when the symbol is traced in a predetermined reverse sense, while allowing said stylus tip to continue unimpeded when the symbol is traced in a normal sense opposite from said reverse sense, said means projecting into each recess having an electric contact surface engageable by the stylus tip when the latter moves thereagainst in said reverse sense and insulating means avoiding contact of the stylus tip with said electric contact surface when the stylus tip moves past said means projecting into the recess in said normal sense, and indicating means electrically connected to said stylus tip and said contact surface and being actuated in response to engagement of the stylus tip with the contact surface.

8. In apparatus of the type described, means defining a sinuous track comprising a number of elementary segments of a plurality of types each having a predetermined shape, a stylus in the form of a writing instrument adapted to be grasped by a test subject for tracing the track, electric circuit means connected with the track defining means and with the stylus for sensing a contact of the stylus with a boundary of the track, first capacitive pressure pick-off means in the stylus responsive to the subject's finger pressure thereon, second capacitive pressure pick-off means including an electrically conductive, yieldably mounted element supporting said track thereon and forming one armature of a measuring condenser and another conductive element fixedly located below said yieldably mounted conductive element and forming another armature of said measuring condenser so that the movement of said yieldably mounted conductive element toward said fixedly located conductive element in response to stylus pressure thereon varies the capacity of said condenser, counter means connected with said contact sensing means for separately totalizing and indicating the numbers of contacts occurring with each type of segment, and first and second indicating means respectively connected with said first and second capacitive pick-off means for indicating the subject's finger pressure on the stylus and the pressure of the stylus on the track, respectively.

9. A stylus for use in psychological test apparatus of the type described, said stylus comprising a cylindrical body in the general form of a writing instrument adapted to be gripped between thumb and fingers of one hand in a predetermined area of said body, a first tubular sleeve of conducting material fixedly secured around said body in said predetermined area of the latter, and a second tubular sleeve of conductive material yieldingly secured around said body in closely spaced, electrically insulated, surrounding relationship to said first sleeve so as to be resiliently deformable radially towards and away from said first sleeve under varying finger pressure, thereby to vary the electrical capacitance present between said first and second conductive sleeves, and means for electrically connecting said first and second conductive sleeves to an external circuit for measuring variations in said electrical capacitance.

10. In apparatus of the type described, means defining a sinuous track, a stylus adapted to be grasped by a test subject for tracing the track, pressure sensing means in said stylus responsive to finger pressure exerted thereon, an electric indicating circuit, impedance means connected in said indicating circuit, and means operated by said pressure sensing means for varying the impedance effectively connected in said indicating circuit in accordance with variations in the finger pressure exerted on the stylus, thereby to vary the indication given by said circuit in accordance with the finger pressure.

11. In apparatus of the type described, the combination as in claim 10, wherein said pressure sensing means includes relatively fixed and movable contact means in said stylus, and resistance means connected with said contact means and with said indicating circuit so as to insert a varying total amount of resistance in said indicating circuit in response to relative movement between said fixed and movable contact means upon variations in the finger pressure on the stylus.

12. In apparatus of the type described, means defining a sinuous track, a stylus adapted to be grasped by a test subject for tracing the track, pressure sensing means associated with said track and being responsive to pressure exerted by the stylus thereon, an electric indicating circuit, impedance means connected in said circuit, and means operated by said pressure sensing means for varying the impedance effectively connected in said circuit in accordance with the pressure exerted by the stylus on the track, whereby the indication given by said indicating circuit varies in accordance with said pressure of the stylus on the track.

13. In apparaus of the type described, the combination as in claim 12, wherein said pressure sensing means includes relatively fixed and movable contact means and resistance means connected with said relatively fixed and movable contact means and with said indicating circuit to insert a varying total amount of resistance in said circuit upon relative movement of said fixed and movable contact means in response to varying pressure of the stylus on the track.

14. A stylus for use in psychological test apparatus of the type described, said stylus comprising a cylindrical body in the general form of a writing instrument adapted to be gripped between thumb and fingers of one hand in a predetermined area of said body, at least one key-like element mounted in said body so as to be yieldingly depressible by finger pressure exerted on said predetermined area as the subject grips the body, an axially displaceable member in said body, coacting camming means on said key-like element and axially displaceable member operative to axially displace the latter in response to depression of said key-like element, cooperating electrical elements carried by said axially displaceable member and fixed to the body of the stylus, respectively, and an indicating circuit having said cooperating electrical elements connected therein so that the output of said indicating circuit is varied in accordance with axial displacement of said member.

15. A stylus as in claim 14, wherein said cooperating electrical elements are in the form of movable and fixed contacts, and said indicating circuit includes a number of resistances selectively insertable in the circuit in response to the variable cooperation of said movable and fixed contacts.

16. In apparatus of the type described, means defining a sinuous track, a stylus adapted to be grasped by a test subject for tracing the track, a balance structure including a balance beam having said track supported on one end thereof, means normally balancing said track to maintain the balance beam in a normal position in the absence of pressure applied to the track by said stylus, a movable electrical element at the other end of said balance beam, fixed electrical means cooperating with said movable electrical element, and an indicating circuit connected with said movable electrical element and said fixed electrical means and including variable impedance means altered in response to movement of said movable electrical element with respect to said fixed electrical means, thereby to vary the indication provided by said circuit in response to a varying pressure of said stylus on said track.

17. An apparatus of the type described, comprising means defining a sinuous track, a stylus adapted to be grasped by a test subject for tracing the track, pressure sensing means in said stylus responsive to finger pressure exerted thereon, a calibrated dial, a plurality of lamps arranged to illuminate successive segments of said dial, and means operated by said pressure sensing means for energizing said lamps sequentially so as to illuminate a selected segment of the dial corresponding substantially to the finger pressure being exerted on the stylus.

18. An apparatus of the type described, comprising means defining a sinuous track, a stylus adapted to be grasped by a test subject for tracing the track, pressure sensing means associated with said track and being responsive to the pressure exerted by the stylus on the track, a calibrated dial, a plurality of lamps arranged to illuminate successive segments of said dial corresponding to increasing pressures of the stylus upon the track, and means operated by said pressure sensing means for energizing said lamps sequentially so as to illuminate the segment of said dial corresponding substantially to the pressure of the stylus on the track.

References Cited in the file of this patent

UNITED STATES PATENTS

| | | |
|---|---|---|
| 1,453,667 | Gillis | May 1, 1923 |
| 1,647,276 | Daman | Nov. 1, 1927 |
| 2,521,500 | Braund | Sept. 5, 1950 |
| 2,755,796 | Boucke | July 24, 1956 |

FOREIGN PATENTS

| | | |
|---|---|---|
| 333,362 | Germany | Feb. 24, 1921 |
| 134,821 | Great Britain | Feb. 26, 1920 |